Figure 1:
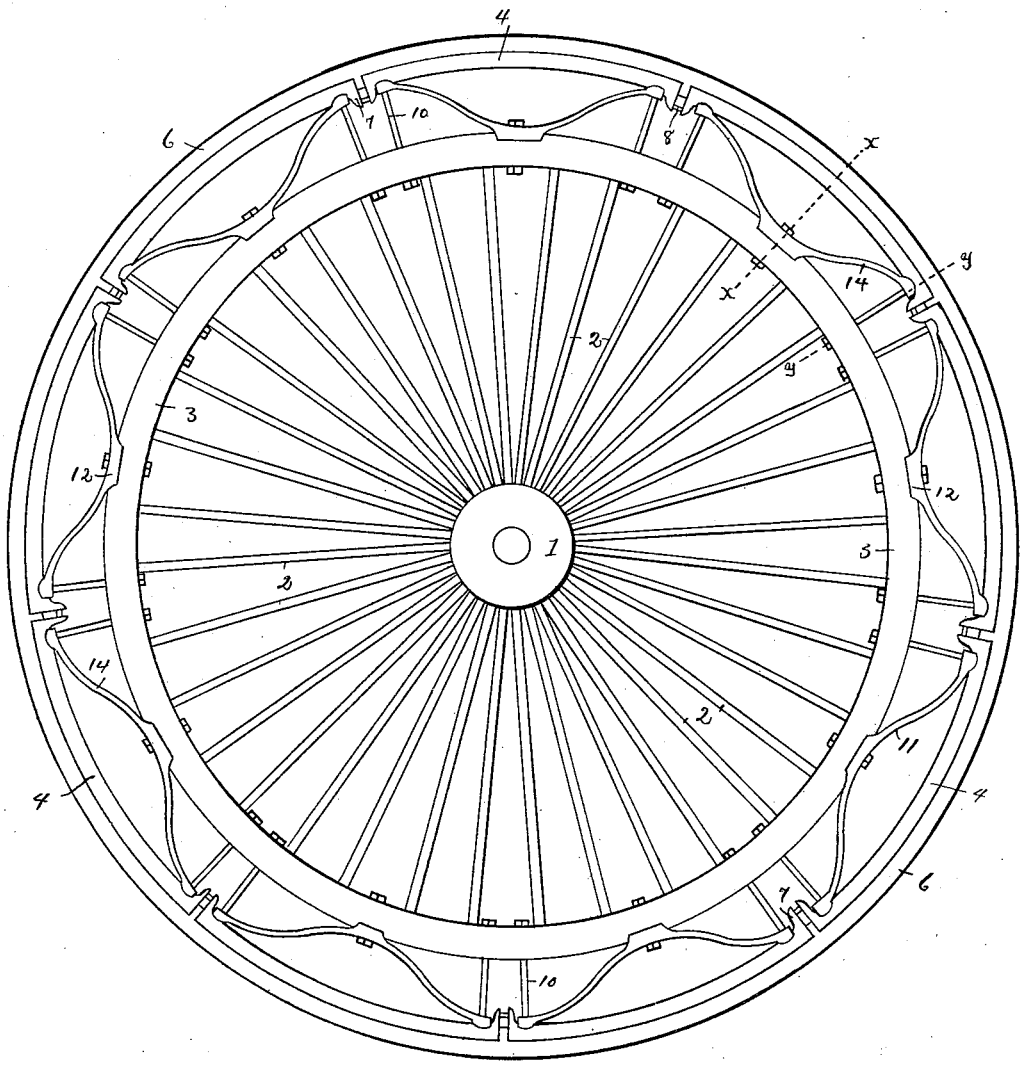

(No Model.)

C. J. MOORE.
WHEEL.

No. 475,464.

2 Sheets—Sheet 1.

Patented May 24, 1892.

WITNESSES
Carroll J. Webster
Gertrude Gifford.

INVENTOR
Charles J. Moore
By Myers & Webster
Attys (No Model.)  2 Sheets—Sheet 2.
C. J. MOORE.
WHEEL.
No. 475,464. Patented May 24, 1892.
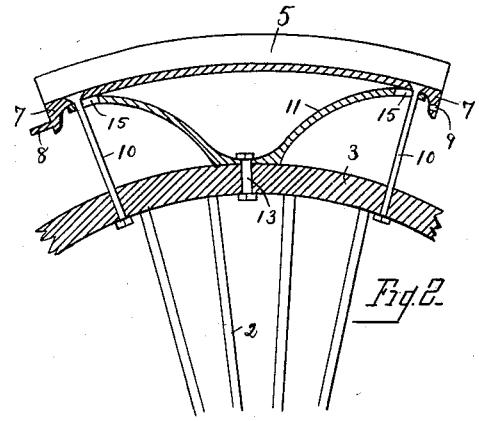
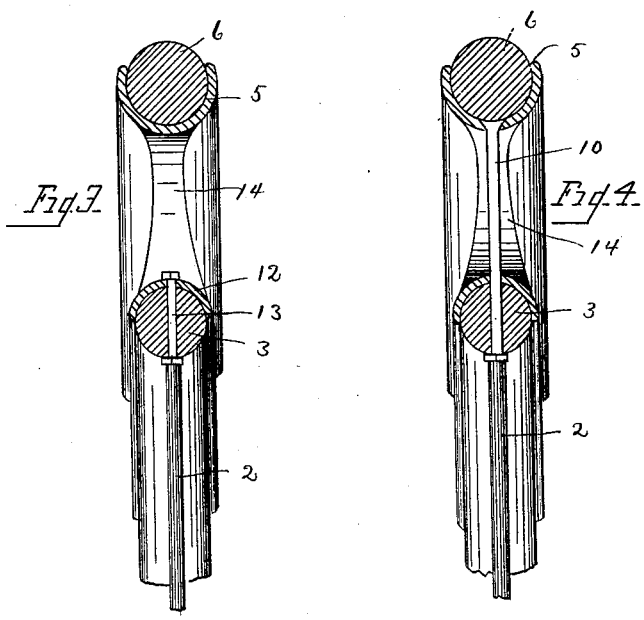
WITNESSES
Carroll J. Webster
Gertrude Gifford
INVENTOR
Charles J. Moore
By Myers & Webster
Attys

UNITED STATES PATENT OFFICE.

CHARLES J. MOORE, OF TOLEDO, OHIO.

WHEEL.

SPECIFICATION forming part of Letters Patent No. 475,464, dated May 24, 1892.

Application filed November 26, 1890. Serial No. 372,744. (No model.)

*To all whom it may concern:*

Be it known that I, CHARLES J. MOORE, of Toledo, county of Lucas, and State of Ohio, have invented certain new and useful Improvements in Wheels; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to wheels, and has more especial relation to that class of wheels used in bicycles, tricycles, &c., where it is desired to relieve the rider from the jar incident to the impact of the wheel.

The object of the invention is to provide a strong durable wheel having a yielding rim with means for insuring a normally-true circle to the tire thereof.

The invention consists in providing a wheel with a segmental rim held yieldingly in place and adapted to be encircled by a tire.

The invention further consists in the parts and combination of parts hereinafter described, and pointed out in the claims.

Heretofore the great objection to riding a bicycle has been the fact of the jar communicated to the rider through the medium of the wheel, due to the impact of the same not only with obstructions, but with a common roadbed, there being a constant vibration even on the smoothest street or road. I have overcome these objections by the means illustrated in the accompanying drawings, in which—

Figure 1 is a plan view. Fig. 2 is a sectional elevation. Fig. 3 is a cross-section on lines $x$ $x$, Fig. 1; and Fig. 4 is a cross-section on lines $y$ $y$, Fig. 1.

1 designates the hub of the wheel, into which are secured spokes 2, which radiate therefrom and are secured into a rim 3.

4 designates a series of segments of a circle, which when assembled form a supplemental rim of greater diameter than the rim 3. Each segment 4 is preferably formed with a groove 5 to receive a tire 6, which may be of rubber or any elastic material, secured upon the exterior of the supplemental rim in any preferred manner. Upon the ends of each segment is formed an enlargement or inwardly-projecting boss 7, one of the bosses 7 upon each segment being formed with a pin 8, the opposite end being formed with a perforation 9 through the boss coincident with the pin and adapted to receive the same when the segments are joined to form a rim. The segments are held in alignment with the rim 3 by means of bolts 10 passing through the segment and rim 3, these bolts not only serving this purpose, but that of restraining the segments from moving outwardly beyond the radii of a true circle, thereby preventing undue stretching of the tire. Intermediate the rim 3 and segmental rim are interposed a series of springs 11, adapted to bear upon the rim 3 and also upon the segments to urge the same outwardly to the extreme limit of the bolts 10, thereby causing the same to normally form a true circle and hold the tire in proper tension. Springs 11 are preferably formed with a central bearing 12 of a contour to closely fit upon the rim 3 and partially embrace the same, and are held firmly in position by a bolt 13, passed through the spring and rim, there being spring-arms 14 projecting each way from the bearing 12, the ends of the same being formed to partially embrace the lower portion of the segment, at which point there is an elongated slot 15 formed, through which the bolt 10 passes, thereby confining the spring between the rim 3 and supplemental rim and holding the same in vertical alignment with each.

From the foregoing description the operation of the wheel will be readily understood.

As will be seen by the drawings, the segments are of a length to rest slightly apart when encircled by the tire, thereby allowing each segment to move toward rim 3 a sufficient distance to relieve the spokes of any jar due to the impact of the tire with any object, the springs at all times yielding sufficiently for this purpose. As the impact is received by the tire the particular segment coincident therewith is allowed by the springs to yield, at which time the slot 15 allows the spring to compress and elongate the sufficient amount, while the pins 8 move inwardly in perforations 9, and if the impact is given directly over one of the bolts 10 the lower end of the same may move inwardly in the rim 3.

As soon as the impact has been received and the particular portion of segment passes from the cause of impact the segment is caused to assume its normal position by reason of the springs.

While I have shown a form of spring particularly adaptable to my purpose, I wish it understood that I may vary the form widely without departing from the spirit of my invention—as, for example, I may support the segments by coiled springs surrounding the bolts 10, with one end bearing upon the rim 3 and the opposite end bearing upon the segment. I may also vary the number of segments and the manner of securing the same in alignment with rim 3 and still construct the wheel within the scope of my invention.

What I claim is—

1. In a wheel, the combination, with an inner rim, of a supplemental spring-actuated outer rim concentric therewith and composed of a series of segmental sections.

2. In a wheel, a rim, a segmental rim concentric thereto, yielding connections interposed between the rims, rigidly secured to the inner rim, and supporting the outer rim.

3. In a wheel, an inner rim, a series of segments forming an outer rim, a series of semi-elliptical springs connected with the inner rim and yieldingly controlling the segments.

4. In a wheel, a rim, a supplemental segmental rim connected therewith by radial bolts, a series of semi-elliptical springs rigidly connected to the inner rims and slotted at their outer ends to embrace the bolts.

5. In a wheel, a supplemental rim secured thereon formed of segmental sections held yieldingly in place, each section having a projecting pin at one end and a perforation formed in the opposite end.

In testimony that I claim the foregoing as my own I affix my signature in presence of two witnesses.

CHARLES J. MOORE.

Witnesses:
WILLIAM WEBSTER,
CARROLL J. WEBSTER.